(12) United States Patent
Desai et al.

(10) Patent No.: US 12,474,938 B2
(45) Date of Patent: *Nov. 18, 2025

(54) FEATURE EXPOSURE FOR MODEL RECOMMENDATIONS AND FEEDBACK

(71) Applicant: GOOGLE LLC, Mountain View, CA (US)

(72) Inventors: Ratna S. Desai, Oakland, CA (US); Alex M. Cook, III, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,371

(22) Filed: Jun. 30, 2023

(65) Prior Publication Data

US 2023/0350705 A1 Nov. 2, 2023

Related U.S. Application Data

(63) Continuation of application No. 17/671,284, filed on Feb. 14, 2022, now Pat. No. 11,734,034, which is a (Continued)

(51) Int. Cl.
*G06F 9/451* (2018.01)
*G06F 3/0482* (2013.01)
(Continued)

(52) U.S. Cl.
CPC ............ *G06F 9/453* (2018.02); *G06F 3/0482* (2013.01); *G06N 5/04* (2013.01); *G06F 3/0237* (2013.01)

(58) Field of Classification Search
USPC ........................................ 715/705, 708, 825
See application file for complete search history.

(56) References Cited

U.S. PATENT DOCUMENTS

| | | | | |
|---|---|---|---|---|
| 5,239,617 A | * | 8/1993 | Gardner | G06F 16/3329 706/45 |
| 9,338,242 B1 | * | 5/2016 | Suchland | G06Q 30/02 |

(Continued)

OTHER PUBLICATIONS

PCT International Search Report and Written Opinion in International Application No. PCT/US2019/034385; 17 pages; dated Sep. 5, 2019.

*Primary Examiner* — Christopher J Fibbi
(74) *Attorney, Agent, or Firm* — Gray Ice Higdon

(57) ABSTRACT

Systems, methods and apparatus for providing user feedback to an action selection model. In an aspect, a method includes displaying interaction elements for recommendations selected by a selection model. Each interaction element may be selected by one of a first interaction mode or a second interaction mode. Selection by the first interaction mode indicates an acceptance of the recommendation described the interaction element. Selection by the second interaction mode causes the user device to display the decision data that caused the selection model to select the recommendation described by the interaction element. In some implementations, the recommendations are actions that a user device may perform. In other implementations, each recommendation may be one of an action that the user device may perform or content that a user may consume.

20 Claims, 10 Drawing Sheets

Related U.S. Application Data continuation of application No. 16/425,461, filed on May 29, 2019, now Pat. No. 11,249,772.

(60) Provisional application No. 62/677,615, filed on May 29, 2018.

(51) Int. Cl.
*G06N 5/04* (2023.01)
*G06F 3/023* (2006.01)

(56) References Cited

U.S. PATENT DOCUMENTS

| | | |
|---|---|---|
| 10,057,630 B1 | 8/2018 | Panchaksharaiah et al. |
| 10,748,159 B1 | 8/2020 | Selinger et al. |
| 11,249,772 B2 | 2/2022 | Desai et al. |
| 2008/0294617 A1 | 11/2008 | Chakrabarti et al. |
| 2009/0006398 A1* | 1/2009 | Lam .................. G06Q 30/02 |
| 2009/0199122 A1 | 8/2009 | Deutsch et al. |
| 2010/0076968 A1 | 3/2010 | Boyns et al. |
| 2014/0201675 A1* | 7/2014 | Joo .................. H04M 1/72454 |
| | | 715/781 |
| 2014/0208350 A1 | 7/2014 | Krishnamurthy |
| 2014/0258270 A1* | 9/2014 | Reese .................. G06F 16/24 |
| | | 707/722 |
| 2015/0128184 A1* | 5/2015 | Tai .................. H04N 21/84 |
| | | 725/46 |
| 2018/0068232 A1 | 3/2018 | Hari Haran et al. |
| 2018/0083894 A1 | 3/2018 | Fung et al. |
| 2018/0083901 A1 | 3/2018 | McGregor et al. |
| 2018/0157380 A1 | 6/2018 | Greenberger et al. |
| 2022/0164205 A1 | 5/2022 | Desai et al. |

* cited by examiner

FEATURE EXPOSURE FOR MODEL RECOMMENDATIONS AND FEEDBACK

BACKGROUND

User devices, such as smart phones, are now an ubiquitous appliance and are used to perform multiple actions for users. Examples of such actions include placing phone calls, text messaging, e-mailing, searching for information, making appointments, and the like. For any particular display environment, a user device may be capable of performing multiple actions.

To help users take advantage of the many different actions that can be performed by the user device, developers have, for user interface environments, created software that displays in the user environment a menu or list of actions that can be performed. For example, when a user device displays an image, several actions that may be performed are saving the image to a storage associated with the user device, or sending the image to another user device by a messaging application, or posting the image to another network site.

Often, however, a particular user may rarely select one or more of these actions. For example, a particular user may prefer to not send images by text messaging. However, the option to send the image by text messaging will still appear when the user is viewing the image.

SUMMARY

This specification relates to providing users indications as to why an action selection model selected particular actions to display to the user and receiving, from the users, feedback regarding the selection of the particular actions and incorporating the feedback into future selections by the action selection model.

In general, one innovative aspect of the subject matter described in this specification can be embodied in methods that include the actions of receiving data specifying an entity for which entity data describing the entity is to be displayed on a user device associated with a particular user; selecting, by an action selection model, from a plurality of actions that the user device may take when the entity data is displayed on the user device and wherein each action is different from each other action, one or more recommended actions, the selection by the action selection model based on decision data that is processed by the model; providing, for display on the user device with the data describing the entity, and for each recommended action, an interaction element that describes the recommend action and that has at least two interaction modes, including: a first interaction mode that when used to select the interaction element causes the user device to perform the recommended action described by the interaction element, and a second interaction mode that when used to select the interaction element causes the user device to display at least a portion of the decision data that caused the selection model to select the recommendation described by the interaction element; and in response to receiving an indication of a second interaction mode that was used to select an interaction element displayed on the user device, providing the at least the portion of the decision data for display. Other embodiments of this aspect include corresponding systems, apparatus, and computer programs, configured to perform the actions of the methods, encoded on computer storage devices. The method may comprise the following optional features. The decision data may comprise action data describing actions that the user device may take when the entity data is displayed on the user device and user data describing one or more of selections responsive to recommended actions by the particular user and interests of the particular user. The decision data may be displayed in response to the selection of the interaction element using the second interaction mode includes data describing user data. The second interaction mode may be used to select the interaction element, the second interaction mode may further cause the user device to display a selectable feedback element that, when selected, generates feedback data describing user satisfaction with the recommended action; and in response to receiving an indication that the feedback element has been selected by a user, providing, to the model, the feedback data generated for inclusion in the user data, wherein subsequent selections of the model are adjusted based on the feedback data included in the user data. The selectable feedback element may comprise an action edit element that, when selected, generates feedback data indicating a user-selected action different from the recommended action selected by the action selection model by selection by the action selection model for subsequent selections of recommended actions for the entity for the particular user. The selectable feedback element may comprise a demotion element that, when selected, generates feedback data indicating the recommended action be demoted by the action selection model for subsequent selections of recommended actions for the entity for the particular user. The selectable feedback element may comprise a promotion element that, when selected, generates feedback data indicating the recommended action be prompted by the action selection model for subsequent selections of recommended actions for the entity for the particular user. The data processing apparatus and the user device may be the same device. The data processing apparatus may be a computer system that is separate from the user device. The method may further comprise: receiving, from a plurality of different user devices, and for a plurality of entities and recommended actions for the entities, feedback data; determining, for each recommended action and entity, an error rate that is based on the feedback data for the recommended action and entity, and wherein the error rate measures a rate at which the user feedback data is determined to indicate user dissatisfaction with the recommended action for the entity; determining, based on the error rates, whether an error rate threshold is exceeded; and retraining an action selection model when the error rate threshold is exceeded. The set of actions may include one or more of a text messaging action, an e-mail action, a voice call action, a sharing action, a posting action, and a purchasing action. The entity may be one of a person, a real-world location, or a real-world event. Providing the decision data for display may comprise: for features that describe data sets of the decision data, accessing data specifying corresponding weights for the features as determined by the action section model; and selecting a subset of the features based on the corresponding weights for the features, wherein the selected feature is determined to be a dominant feature based on its corresponding weight; and providing, for each feature that is determined to be dominant, a description of a feature for display. Providing the at least the portion of decision data may comprise providing one or more elements of a complete decision data set. The one or more elements of decision data are selected based on a weight of their respective contribution to the recommended action.

Another innovative aspect of the subject matter described in this specification can be embodied in methods that include receiving data specifying an entity for which entity data describing the entity is to be displayed on a user device associated with a particular user; selecting, by a selection model, from a plurality of candidate recommendations, wherein each recommendation describes one of an action that a user device may perform or content that a user of the user device may consume, recommendations to be displayed with the entity data, the selection by the selection model based on decision data that is processed by the model; providing, for display on the user device with the data describing the entity, and for each recommendation, an interaction element that describes the recommendation and that has at least two interaction modes, including: a first interaction mode that when used to select the interaction element indicates an acceptance of the recommendation described the interaction element, and a second interaction mode that when used to select the interaction element causes the user device to display the decision data that caused the selection model to select the recommendation described by the interaction element; and in response to receiving an indication of a second interaction mode that was used to select an interaction element displayed on the user device, providing the decision data for display. Other embodiments of this aspect include corresponding systems, apparatus, and computer programs, configured to perform the actions of the methods, encoded on computer storage devices. It will be appreciated that features described in relation to one aspect may be combined with features of another aspect.

Model training in a supervised manner by designated trainers can take weeks before the model is ready to deploy to a user base. Moreover, depending on the skill of the curators and the training data, the trained model may still be prone to error from the perspective of the user base. Further still, when new actions or applications become available and that were not used to train the action selection model, the action selection model will select actions that are very likely to be unsatisfactory for the user base. Finally, the model is not readily tunable to individual users.

The models are typically based on a variety of signals or features which serve to drive the output (recommendation) based on a variety of other, often contextual, inputs. Certain of these signals or features are given a higher weight than others in the model, meaning that those higher-weighted signals or features impact the ultimate recommendation more than others. However, most commonly today, such models make recommendations without permitting a user (and often even the model developer) insight into which signals or features have been relied on to make the recommendation. This lack of transparency can hide fixable errors, mask potentially available insights into the model's recommendations and it's accuracy, and call into question its trustworthiness and reliability.

The particular embodiments of the subject matter described in this specification can be implemented to realize one or more of the following advantages that overcome these shortcomings. The system surfaces to a user a natural language description of signals, or features, used to select and present an action, interface element, etc. to the user. A data structure that labels data types, such as calling data, texting data, browsing data, song library data, and the like, allows for the descriptive labels to be used to characterize the particular subsets of user data that the model determined to be dominant for recommending a particular action. This allows for users that are not versed in data mining to nevertheless understand what particular user data is dominant for particular recommendations. The presentation of the data in this manner is an unconventional process that enables users to make better informed decisions when either accepting the recommendation or providing feedback, and also allows for multiple users to provide model validation and feedback in near real-time. This, in turn, is a technical improvement in the field of data processing and model development and maintenance.

Another advantage is the intuitive user interface that presents the underlying decision data and optionally solicits feedback that obviates the need for more complex and CPU/memory consuming applications required to expose features relied on by machine learning models, and enables the tuning of the models "on the fly." This improves device performance as fewer computer resources are required for model analysis. This also improves network and system performance when a capability to surface the features does not require a call to the server.

Moreover, by receiving feedback data from a user base that is typically much larger than training curators, the model may be trained more quickly, and on a more robust data set, than when training curators are training the model. This results in a model that is more robust to "noisy" recommendations. Additionally, this also results in convergence of the model to an acceptable performance standard more quickly than when training curators are training the model. Finally, when new actions that were not available when the model was initially trained do become available, the feedback data provided by the user base can quickly surface the new actions for model training and the model can be trained for selecting the action using the feedback data.

From a user interface perspective, the feedback data can be solicited by use of an intuitive interaction model. The interaction model has two selection modes. A first interaction mode, when used to select a recommended action, causes the action to be performed at the user device. The second interaction mode, when used to select the recommended action, causes the user device to display decision data describing user data that caused the model to select the recommended action described by the interaction element, and a selectable feedback element that, when selected, generates feedback data describing user satisfaction with the recommended action. It is this unconventional feature of providing an intuitive feedback collection element to multiple users in a large user base that allows for users that are unskilled in actual model training to nevertheless provide feedback data that is used to adjust the behavior of the model and/or retrain the model.

The advantages listed above are each significant technical improvements in the field of model training data development, model training, and user interfaces.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
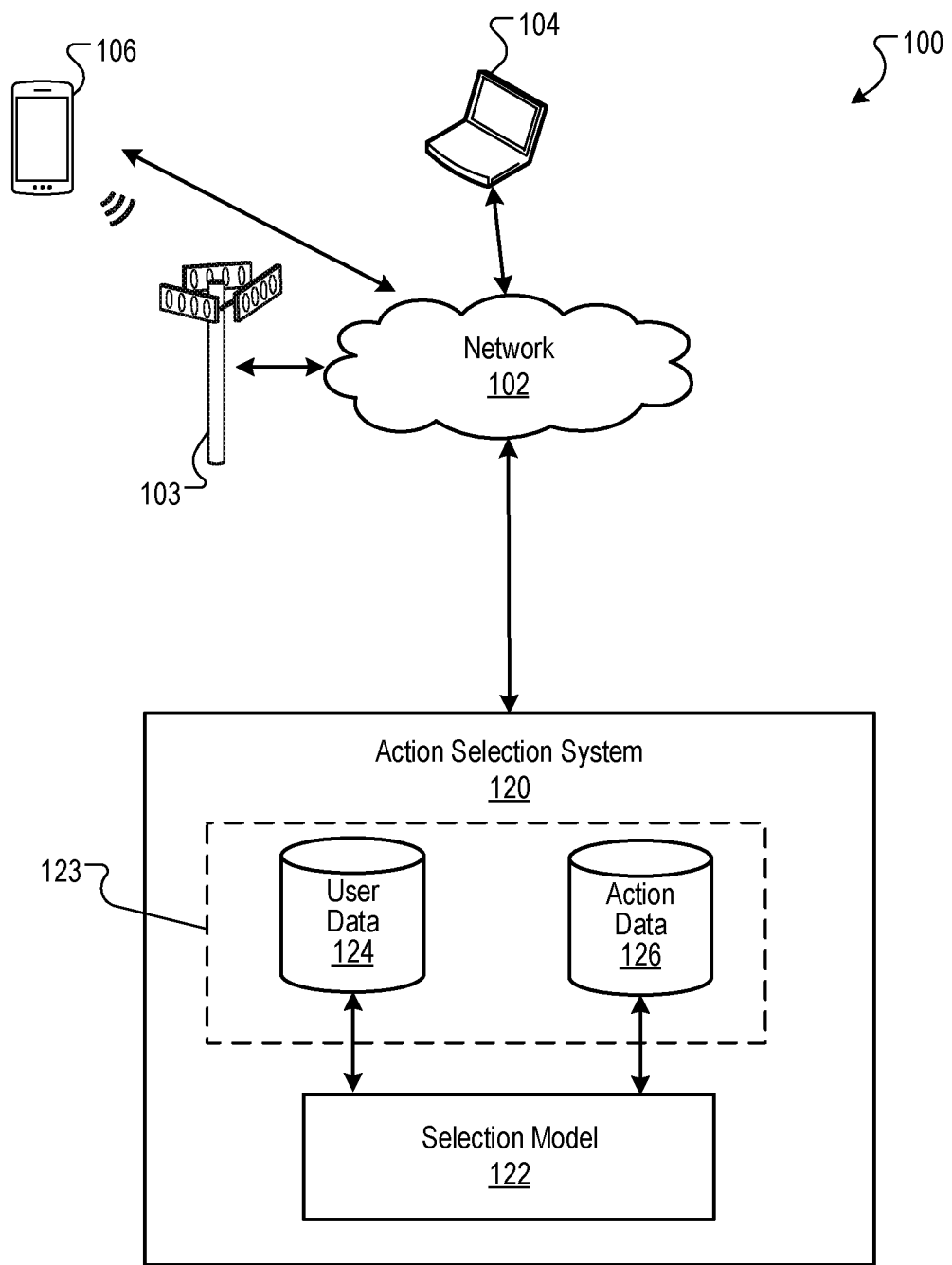
FIG. 1 is a block diagram of an environment in which model recommendations for actions are provided for user devices.

A supervised model recommendation and feedback system receives data specifying an entity for which entity data describing the entity is to be displayed on a user device associated with a particular user. The entity may be an interest of the user, a person, a place, or a real-world event, either virtual or physical, the visualization or other presentation of data associated with the user (or with some other third party), an element of content or portion thereof, etc., which may be a subject of a current display environment. The entity data may be, for example, an image of the entity and textual data describing the entity.

An action selection model is used to select actions that may be performed by a user device when the data describing the entity is displayed on the user device. For example, if the entity is a concert for a certain performer, the data may be the time and location of the concert, and the name of the performer. The possible actions that may be displayed are buying tickets to the concert, sharing the data describing the concert with a contact, and saving the concert as an event in a calendar, among others.

From the possible actions, the action selection model selects one or more recommended actions. The selection by the action selection model is based on action data describing actions that the user device may take when the entity data is displayed on the user device. The selection may, in some embodiments, also be based on user data describing one or more of selections responsive to recommended actions by the particular user, and in some additional embodiments also be based on interests of the particular user. For example, the action selection model may determine that the user of the user device and another user ("User B") referenced by contact information on the user device both have expressed significant interest in the particular performer, and both have shared with each other links to videos and songs by the particular performer. Assume that based on this data the action selection model selects a "Share with User B" action and "Buy tickets" action.

The user device displays data describing the entity (in this example, the concert), and for each recommended action, interaction elements that describes the recommended action (again, in this case, the "Share with User B" and "Buy tickets" actions). Each interaction element has at least two interaction modes. The first interaction mode, when used to select the interaction element, causes the action to be performed at the user device. The second interaction mode, when used to select the interaction element, causes the user device to display decision data describing one or more features (such as a common selection for like entities in an anonymous collection of recorded actions, a pre-established association of the action with the entity, past actual or similar specific user actions, etc.) that caused the model to select the recommended action described by the interaction element, and, optionally, a selectable feedback element that, when selected, generates feedback data describing user satisfaction with the recommended action.

In this example, assume that the user selects the "Share with User B" interaction element using the second interaction mode. The user will then be shown or otherwise provided with information explaining why the model selected sharing with User B as the recommended action. In particular, the system will display to the user the decision data that describes that the user and User B have an interest in the performer as determined, for example, by identifying that the user has shared links to videos and/or songs by the particular performer with User B (outbound sharing), and User B has shared links to videos and/or songs by the particular performer with the user (inbound sharing). Many other indicia of common interest are possible, such as one or more songs from the performer in both of the user's and User B's song libraries, provided that User B has given explicit permission to the system to access User B's library in order to make such a determination. (It will be assumed herein that, in appropriate cases, where a party's private data is accessed by a process or system described herein explicit and informed consent to do so has first been provided by that party.)

The user may then invoke the action, or, alternatively, provide feedback data that indicate dissatisfaction with the selected action. For example, assume the user is not interested in going to the concert with User B because User B will be unavailable during the concert date. The user may, for example, provide feedback that indicates the user does not wish share the concert information with User B. Should the user at a later time have the concert information displayed again at the user device, the feedback data will preclude the model from selecting the "Share with User B" action again.

These features and additional features are described in more detail below. Moreover, while the examples described below are in the context of action recommendations, in other implementations, the decision data for other types of recommendations can also be provided to the user, and the user may be able to likewise provide feedback data for such recommendations. Such recommendations may include content suggestions, topic suggestions, and other suggestions that do not necessarily invoke actions. For example, each recommendation may be one of an action that the user device may perform or content that a user may consume. Selection by the first interaction mode indicates an acceptance of the recommendation described by the interaction element. Selection by the second interaction mode causes the user device to display the decision data that caused the selection model to select the recommendation described by the interaction element. Thus, while the description below uses an action recommendation as a primary example, the systems and methods described below are applicable to many different types of recommendations, and not limited to action recommendations.

FIG. 1 is a block diagram of an environment in which model recommendations for actions are provided for user devices. A computer network 102, such as the Internet, or a combination thereof, provides for data communication between electronic devices and systems. The computer network 102 may also be included, or be in data communication with, one or more wireless networks 103 by means of one or more gateways.

User devices 104 and 106 are capable of requesting and receiving resources over the network 102, establishing communication channels, e.g., voice communications, with other user devices, and also capable of performing other actions. Example user devices 104 and 106 include personal computers, mobile communication devices, and other devices that can send and receive data over the network 102. In the example of FIG. 1, the user device 104 is a laptop computer, and the user device 106 is a smart phone. An example smart phone is described with reference to FIG. 5 below. The user devices 104 and 106 may communicate over the networks

102 and 103 by means of wired and wireless connections with the networks 102 and 103.

As described with reference to FIG. 5, a user device may be able to perform actions for various programs and capabilities. Some of the actions may be implemented at the operating system level and are available for multiple programs and in multiple user interfaces; other actions may be program-specific and dependent on the applications installed on the user device. The actions may change over time, as the user may add and remove various programs, and operating system updates may deprecate or add actions. The actions differ from each other for each action. For example, a telephone application may include the action of placing a call or the action of texting in response to voice commands or selection of an interaction element (e.g., a soft button that when selected causes the action to be performed); a calendar application may include the actions of "scheduling" a meeting, and "accepting" or "declining" a meeting invitation; a mapping service may include the actions of "mapping" a location; an operating system may include the actions of forwarding images and sharing links with contacts; and so on.

Likewise, the user device 104 may perform a similar set of actions, depending on capabilities and applications installed on the user device. In some implementations, both devices 104 and 106 utilize a voice recognition system that receives voice input, performs language recognition processing, and parses the resulting recognized words and phrases. The parsed words and phrases, which are referred to as n-grams, where each n-gram may constitute one or more words, are then processed to determine whether the voice input invokes a particular action. A voice recognition and language processing system is not necessary, however, as the devices can also receive textual command inputs and selections of soft buttons/keys as well.

To assist users in selecting actions, an action selection system 120 is used to recommend actions to the user by means of interaction elements. The system 120 may be implemented locally on a user device, e.g., device 106, or may be implemented in a server that is remote from the user device. Thus, even though the system 120 is depicted in FIG. 1 as being remote from the user device 106, it is to be understood that the system 120 may also perform the recommendation and feedback generation processes described below while implemented in a user device.

To make the recommendations, the system 120 utilizes a selection model 122 that accesses decision data 123, and makes recommendations based on the decision data 123. The selection model 122 may be any model that can be trained or programmed to make recommendations. The decision data 123 can be data sets for which the model 122 has been programmed or otherwise learned to process to make the recommendations. The decision data 123 may be data that is specific to only the user, e.g., the decision data 123 that includes only data describing actions taken by the user, location of the user, and interests of the user. In other implementations, the decision data 123 may be "global" data that may based on data from multiple, different users, and which may (or may not) include data specific to the user. In the example implementation of FIG. 1, the decision data 123 includes user data 124 and action data 126, and the selection model 122 is an action selection model.

The user data 124 describes selections responsive to recommended actions by the particular user and interests of the particular user. The selections responsive to recommended actions include positive selections, in which the user selected a particular action as identified by an interaction element to invoke the action at the user device, and negative selections, which include non-selections of a particular action as identified by an interaction element and dismissals of actions. A non-selection of a recommended action may occur when a user selects another action instead of the recommended action. A dismissal may occur when a user refuses the action or any other action. Of course, other types of interactions or lack of interactions may also be utilized, such as which element of a multi-element selection option (e.g. which color from a color picker) or state of an element from a state-selectable selection option (e.g., volume selection from a volume control) a user selects, etc. The user data may also include feedback data generated in response to feedback element selections by the user. Feedback data is described in more detail below.

The user data 124 may also include data that describes learned interests in various entities. The interests are learned based on explicit user indicators and implicit user indicators. Explicit user indicators are generated by inputs through which the user directly expresses positive or negative interest in particular entities. For example, a user may "like" certain resources, "dislike" other resources, "share" images and links, and the like. Each of these actions can be interpreted as explicit user actions that indicate either a positive or negative interest. Other types of explicit user indicators can also be used.

Implicit user indictors are generated by inputs through which the user indirectly expresses positive or negative interest in particular entities. For example, saving a contact for a person entity can be construed as a positive interest in the person, while deleting a contact for a person entity can be construed as a negative interest in the person. Likewise, frequently communicating with a person entity can be construed as a positive interest in the person, while infrequently communicating with a person entity can be construed as a negative interest in the person. Other types of implicit user indicators, e.g., sharing links with a particular person, searching for a particular landmark entity, or making a reservation at a hotel entity, can also be used.

The user data 124 may also describe entities with which the user is associated. An entity may be an interest of the user, a person, a place, or a real world event, or any other object, either virtual or physical, which may be a subject of a current display environment or which the user may have had previously expressed an interest. For example, the user data 124 may include contacts stored in a contact application; recent Internet navigation history and browser bookmarks; applications installed on the user device; and the like.

Action data 126 describes actions that the user device may take. The actions may be based on operating system actions that a user can activate, and may also include actions that are not operating system actions but that instead are available through particular applications installed on the user device 106. In embodiments in which the user device controls some other device, the action data may in addition describe the actions that the user device may control on the other device.

As explained above, the action selection model 122 is a model that can recommend actions to the user based on the user data 124 and the action data 126. The model 122 can be a model that has been trained to take, as input, the user data 124 and action data 126 and recommend actions for that can be performed when particular entity data for an entity is displayed on a user device. For example, when contact data for a particular person is displayed, the recommended actions may be to call the contact, text the contact, e-mail the contact, or delete the contact from a contact store. Similarly, when an image is displayed, the recommended actions may be to save the image to a local storage on the user device 106, to text the image to a particular contact, or to post the image to social media.

The model may make recommendations based on data completely independent of any action the user has ever taken, and the model may also make recommendations based on user data or actions the user has taken. For example, the model may access location data describing a current location of the user device, user e-mails, etc.

Each recommended action is indicated by an interaction element that is displayed with the entity data. Each interaction element describes the recommended action and has at least two interaction modes. The first interaction mode is used to select the interaction element in a manner that causes the user device to perform the recommended action described by the interaction element. The second interaction mode is used to select the interaction element in a manner that causes the user device to display decision data describing user data that caused the model to select the recommended action described by the interaction element, and a selectable feedback element that, when selected, generates feedback data describing user satisfaction with the recommended action.

Selection of recommended actions and the use of the interaction modes for the interaction elements is described with reference to FIGS. 2A-2F and FIG. 3. FIGS. 2A-2F are illustrations of a user interfaces for action recommendations and user interfaces that are used to provide feedback responsive to recommended actions to the action selection model. FIG. 3 is a flow diagram of an action recommendation and feedback process 300. The process may be implemented on the user device 106, or on a server that is remote from the user device 106 but in data communication with the user device 106.

The process 300 receives data specifying an entity for which entity data describing the entity is to be displayed on a user device associated with a particular user (302). For example, with reference to FIG. 2A, the entity data 212 may be a resource (such as an electronic notification, text and image data, etc.) that describes an upcoming concert for a performer. The entity data 212 is to be displayed on the user device 200.

The process 300 selects, by the action selection model 122, recommended actions to display (304). For example, the action selection model 122 may select a subset of actions from a larger set of actions that the user device may take when the entity data 212 is displayed on the user device 200. The selection by the action selection model 122 is based on the action data 126 describing actions that the user device 200 may take when the entity data is displayed on the user device 200, and also on user data 124 describing one or more of selections responsive to recommended actions by the particular user and interests of the particular user. The model 122 may be any appropriate model that can process action data to make the selections. For example, the model 122 may be a trained model, such as a support vector machine, a linear regression model, or a neural network.

The user data 124 and the action data 126 may be structured such that data types are mapped to semantic descriptors. For example, data indicating a text message sent from the user to another user may be labeled with descriptive tags, such as "text message," "User B recipient," data indicating reservations may be labeled according to the date, the type "reservation," and the names of restaurants, and so on. Each of the data sets are of particular types, such as text messaging data, calling data, reservation data, sharing data, song library data, and so on, and each data set is labeled by the descriptive tags. The tags are used by the system 120 to characterize data sets that are that are determined to be significant for a particular recommendation.

The process 300, for each recommended action, provides a multi-mode interaction element for display (306). For example, in FIG. 2A, for the entity data 212 that describes an upcoming Ima Starr concert, the model selected as recommended actions "Share with User B" and "Buy Tickets." For each action, there is a multi-mode interaction element that describes the action, as shown by interaction elements 214 and 216. For example, the two modes may be a first interaction mode that is signaled by a "short press" of an interaction element, and a second interaction mode that is signaled by a "long press" of the interaction element.

The process 300 receives a selection according to first or second mode (308). For example, assume the user selects the interaction element 214 for the action "Share with User B."

If the received selection is according to the first mode, then the process 300 performs the first action (310). For example, a "short press" will cause the data 212 to be shared with a device that is associated with User B by a communications application operating on user device 200. The share may be, for example, the sending of a resource locator for the data 212 to the user device of User B.

In some implementations, the recommendation for the action may include data that allows the user device to perform the action by launching an application on the user device. In other implementations, the user device may, in response to a selection of the interaction element by the first selection mode, send data to a remote server, and the remote server performs that action. Thus, performing an action includes both the user device actually performing the action, or, alternatively, the user device invoking a separate system to perform the action.

However, if the selection is according to the second mode, then the process 300 displays decision data and, optionally, a selectable feedback element (312). For example, assume the user exercised a "long press" on the interaction element 214. The resulting user interface 220 that displays the decision data is illustrated in FIG. 2B. The interface includes decision data 222 describing user data that caused the model 122 to select the recommend action described by the interaction element 214. Here the decision data is described in a natural language form, and in particular, the song libraries of the users and the shares of data between the users appear to have been the most significant features of data in making the recommendation for the "Share with User B" action.

The description may be generated from a merger of feature values and description template. The description template includes variable and invariable data, where the variable data is populated depending on the recommended action and features that are determined to be dominant for the decision that resulted in the recommendation. An example template may be:

We thought you would want to [RECOMMENDED_ACTION] because [FEATURE_DESCRIPTION[i]] &and In the example template, the variable data is enclosed in the brackets. The variable data field RECOMMENDED_ACTION is populated with a recommended action description. Likewise, the FEATURE_DESCRIPTION[i] field is populated with description of a feature that is determined to be dominant. The &and operator is used to concatenate feature descriptions when multiple features are determined to be dominant and selected.

A feature may be determined to be dominant in a variety of ways. For example, for a learned function where the data for each feature may be evaluated to generate a weight, a dominant feature may be determined when its corresponding weight meets a threshold. If none of the weights meet the threshold, then the feature with the highest corresponding weight may be selected.

Other ways of selecting dominant features may also be used. Such other ways may include determining a most recently used action with the shown content; determining a most commonly used action among a like population; determining a best performing application for the action; determining relations among features associated with past user actions (e.g., when listening to jazz, setting volume to medium-low); determining whether a suitable secondary device is enabled and on network (e.g., suggesting sending content to a video streaming device when one is found on the user's current network); etc.

In another implementation, the feature weights may be normalized and features having weights that meet a normalized threshold are selected. Again, if none of the weights meet the threshold, then the feature with the highest corresponding weight may be selected.

The feature descriptions may also be generated according to templates. Some feature descriptions may only include invariable data, e.g., a search history feature may simply be described as "your search history." Conversely, a feature that may have multiple dimensions, such as a texting feature having a separate dimension for each recipient, may have a template of [you and [OTHER_USER] exchange texts frequently]. For example, if a texting action is recommended because the exchange of text between the user and another user, User C, is a dominant feature, the decision data may read as follows (with the variable data in italics for illustrative purposes):

We thought you would want to use text as a primary communication with *User C* because *you and User C exchange texts frequently.*

With reference to FIGS. 2B, the variable data are "share with user B", "you both have Ima Starr songs in your libraries," and "you often share with each other links to her songs and videos."

In other implementations, the decision data may be less descriptive. For example, the decision data could read "Our recommendation is primarily based on song library and sharing activity."

The selectable feedback elements 222, 224, 226, 228, 230 and 232 are showing in FIG. 2B. More or fewer feedback elements could be displayed, depending on the implementation used.

Figure 2A:
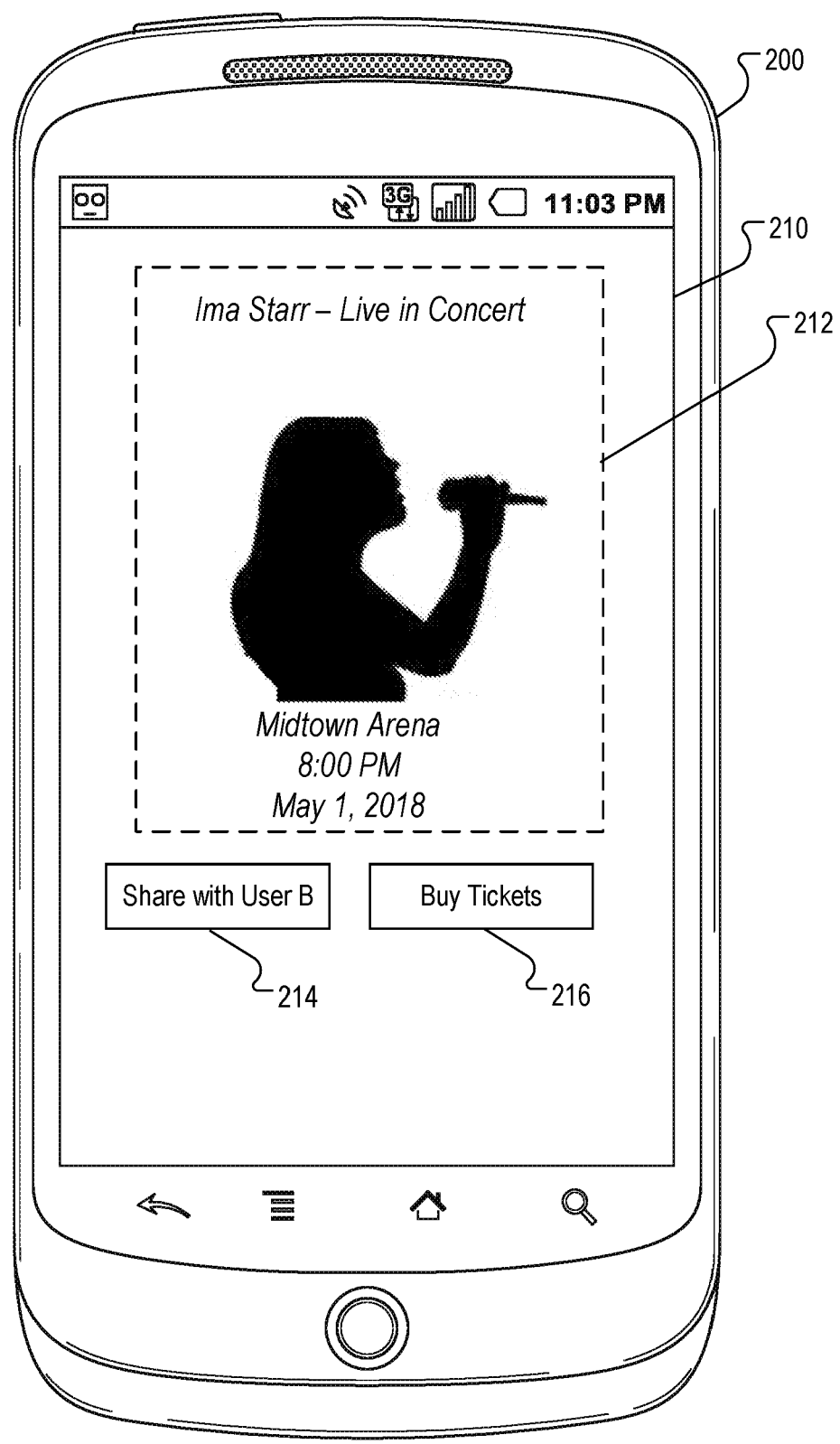
FIG. 2A, FIG. 2B, FIG. 2C, FIG. 2D, FIG. 2E, and FIG. 2F are illustrations of a user interfaces for action recommendations and user interfaces that are used to provide feedback responsive to recommended actions.
Figure 2B:
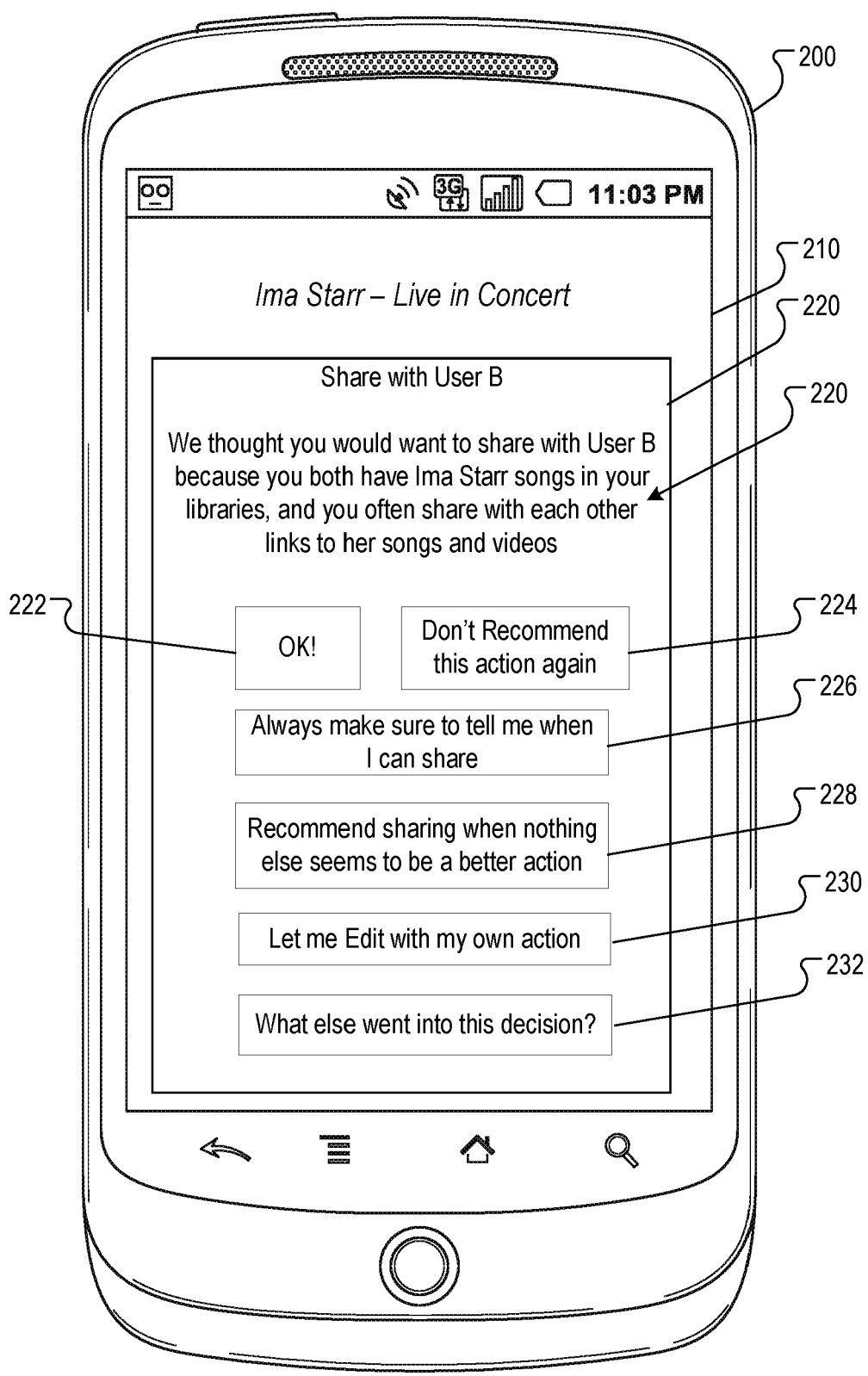
Figure 3:
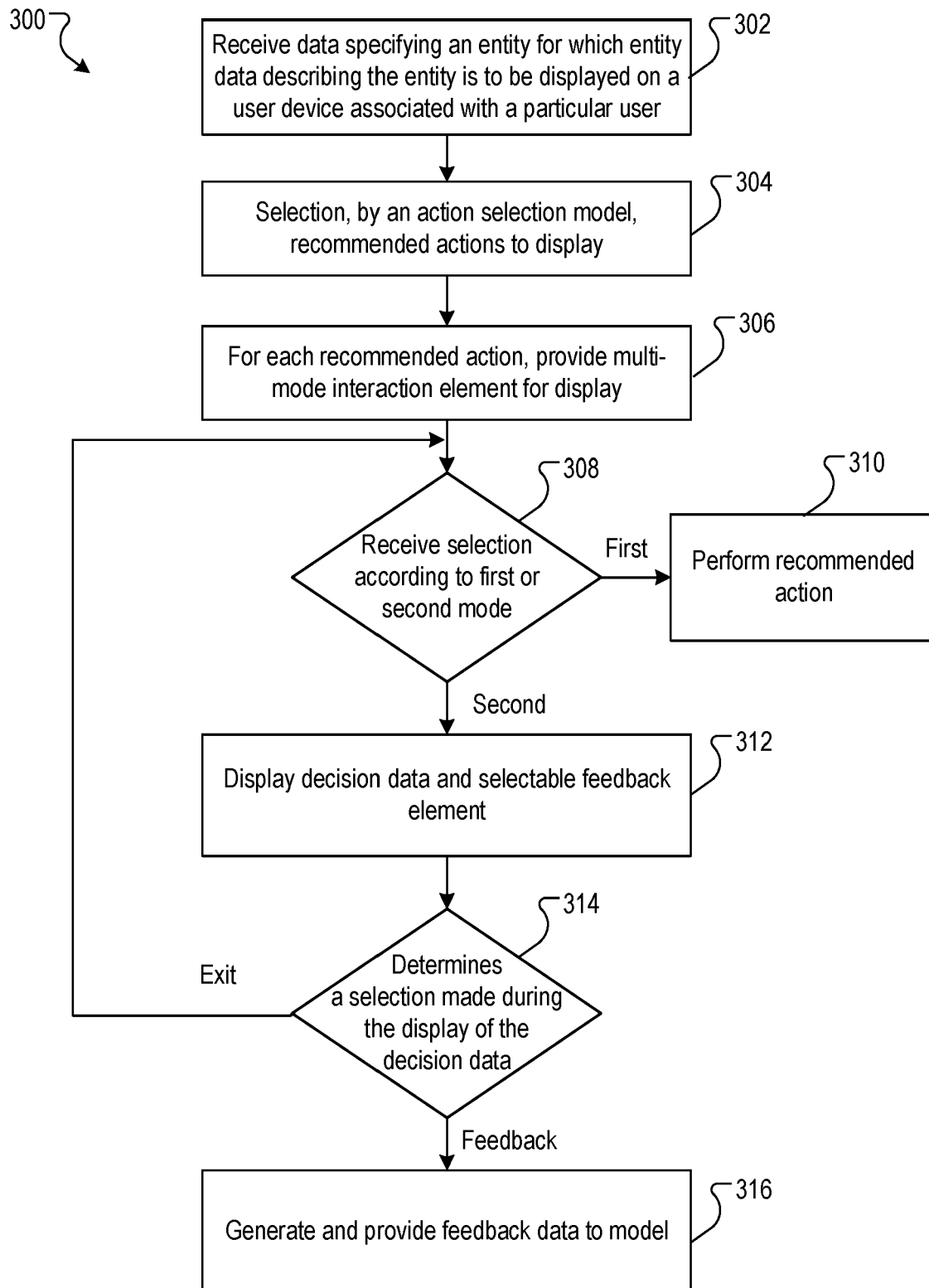
FIG. 3 is a flow diagram of an action recommendation and feedback process.

Selection of the feedback element 222 will return the user to the prior user interface shown in FIG. 2A. The feedback data that is generated may be a confirmation count that the model may use when validating the recommendation. All feedback data that is generated for the model is also stored in the user data 124 for subsequent consideration by the model 122.

The feedback element 224 is an edit element that, when selected, generates feedback data that will preclude the model from recommending the action again. In some implementations, the feedback data only precludes the model from recommending the action in the context of the particular entity User B (or any "Ima Starr" entity). In other implementations, the feedback data precludes the model from recommending the action for all entities. Other configurable options may also be available to the user.

The feedback element 226 is a promotion element that, when selected, generates feedback data indicating the recommended action be prompted by the model for subsequent selections of recommended actions. For example, the user may prefer to share content often, and thus may select the element 226. Again, in some implementations, the feedback data may only promote the action in the context of the particular entity User B (or any "Ima Starr" entity), and in other implementations, the feedback data may promote the recommendation of the action for all entities. Other configurable options may also be available to the user.

The feedback element 228 is a demotion element that, when selected, generates feedback data indicating the recommended action be demoted by the model for subsequent selections of recommended actions. For example, the user may not prefer using a share action, but still may want the option available, and thus may select the element 226. Demoting the recommended action causes the corresponding interaction element 214 to be, for example, listed after the corresponding interaction element 216 instead of before for future recommendations. Again, in some implementations, the feedback data may only demote the action in the context of the particular entity User B (or any "Ima Starr" entity), and in other implementations, the feedback data may promote the recommendation of the action for all entities. Other configurable options may also be available to the user.

The feedback element 230 allows the user to edit the recommended actions. Selection of this feedback element takes the user to the user interface of FIG. 2C, which is described in more detail below.

The feedback element 232 provides a user interface that lists a larger set of features that were used in making the recommendation. Selection of this feedback element takes the user to the user interface of FIG. 3F, which is described in more detail below.

The process 300 determine a selection made during the displaying of the decision data (314). If the selection is the selection of the feedback element, then the process 300 generates feedback data (316). The feedback data generated may be as described above when the selections are for one of the elements 224, 226 and 228. Also, if required by the selection, takes the user to corresponding user interface. However, if the selection is to exit the display of the decision data, then the process 300 returns to step 308.

Sometimes feedback data is generated as the result of further selections in subsequent user interfaces. For example, assume the user selected feedback element 230. This results in the user interface 240 of FIG. 2C. In this user interface, the user may select other actions, such as 242 or 244. Selection of one of these actions will cause the interaction element 214 of FIG. 2A to be replaced with a corresponding interaction element for the user selected action. These other actions that are listed may be, for example, the actions that are the next highest ranked relative to the actions recommended in FIG. 2A.

Figure 2C:
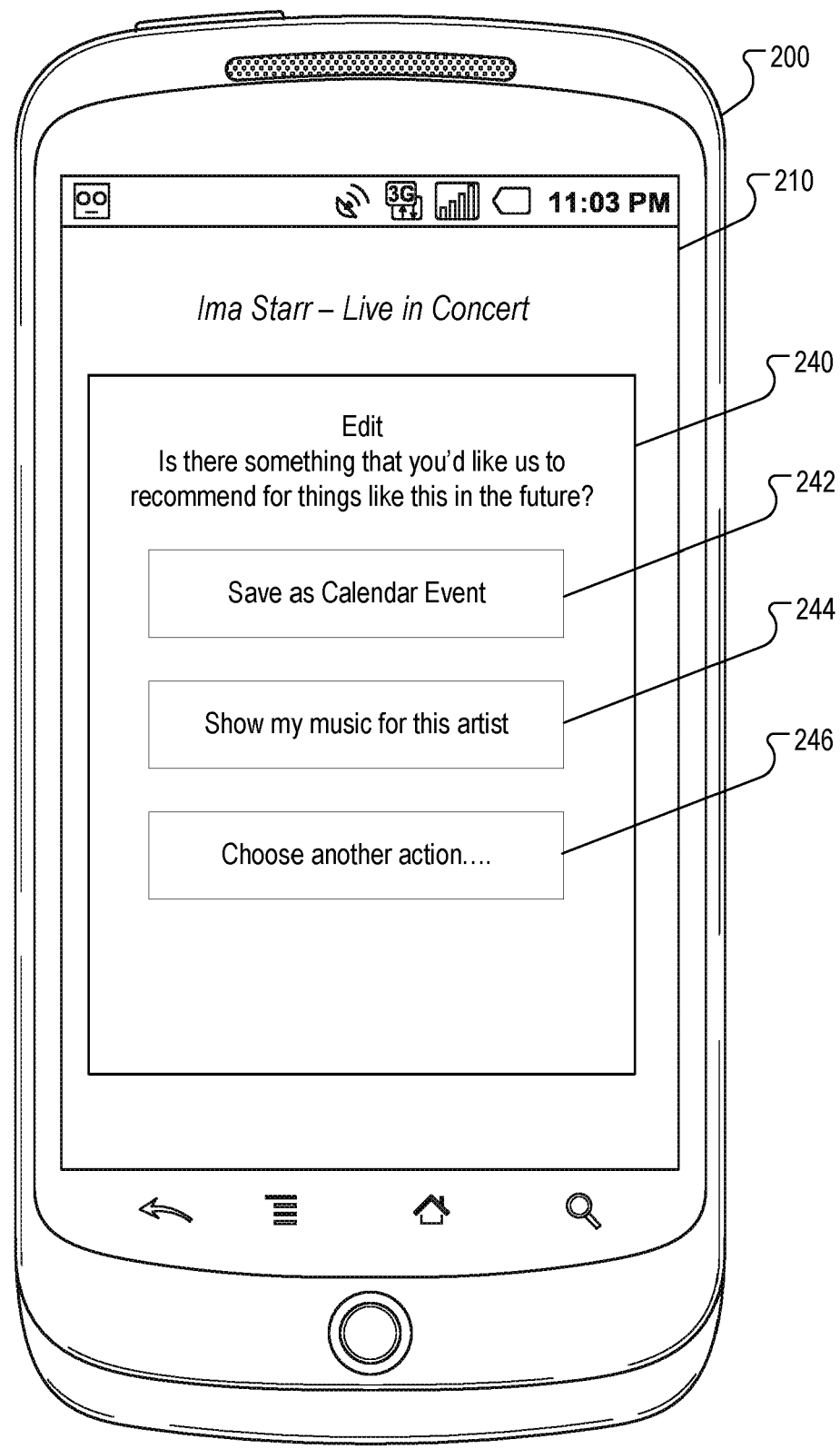
Figure 2D:
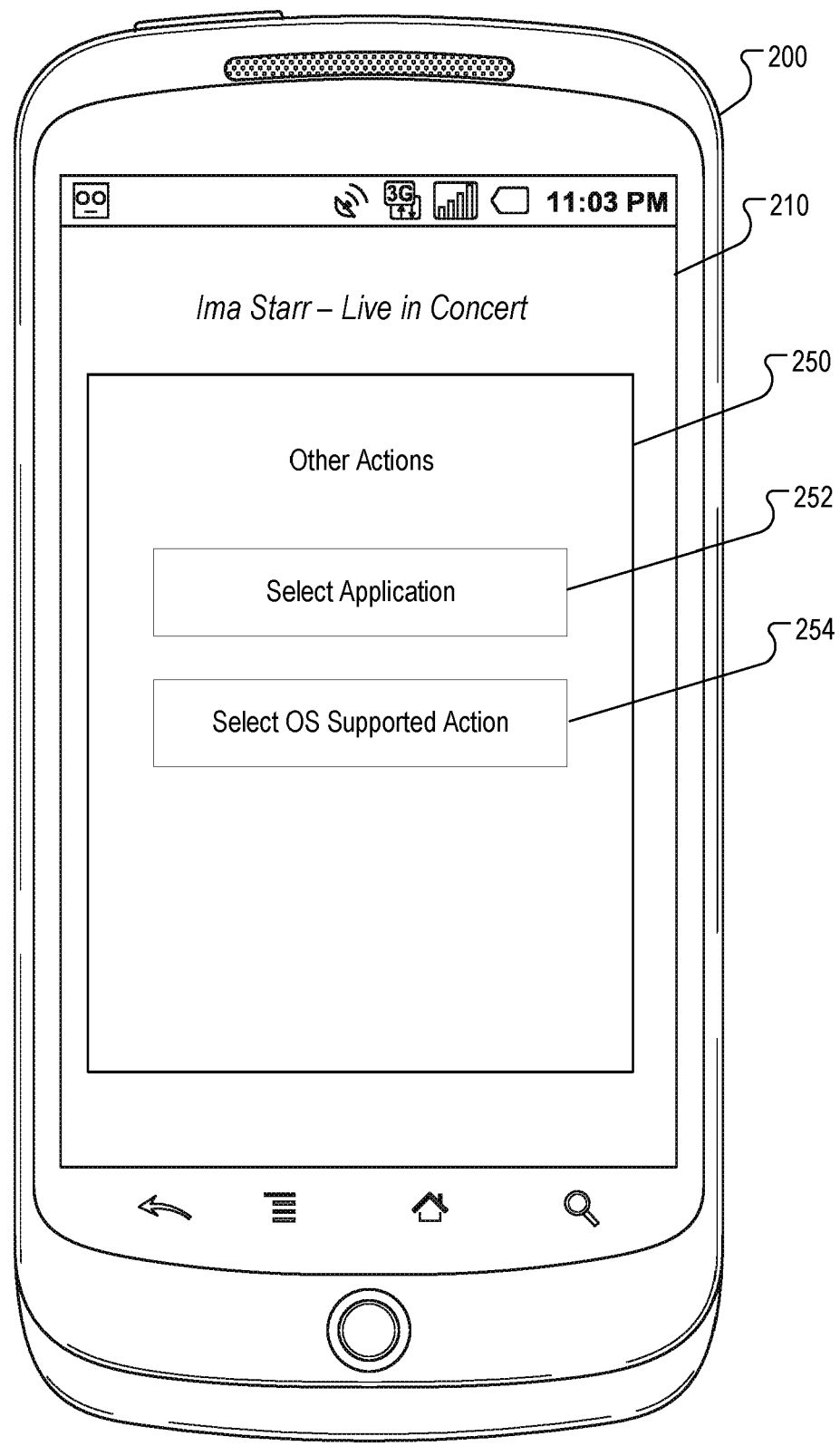

If the user would rather view additional actions that are not shown in FIG. 2C, the user may select the "Choose another action" element 246. The selection results in the user interface 250 of FIG. 2D. In the user interface of FIG. 2D, there are two options, a "Select Application" option 252 and a "Select OS Supported Action" option 254. The option 252 is available to select actions that the action selection mode 122 may not have considered or may not have otherwise recommended. In the case of the former, the model 122 may not consider an action when an action was otherwise unavailable when the model was created, or if the model 122 was not trained for the action. For example, assume a new service, "StreamSeat," is released after the model is created. A corresponding native application is installed on the user device 210, and a supported action is buying a "StreamSeat," which allows the user to view the concert live from a user device or television. Because the model is not aware of this action, the user may manually select the action by first selecting the option 252, and then selecting the native application, which will surface the available action (or allow the user to configure the action to be available).

Figure 2E:
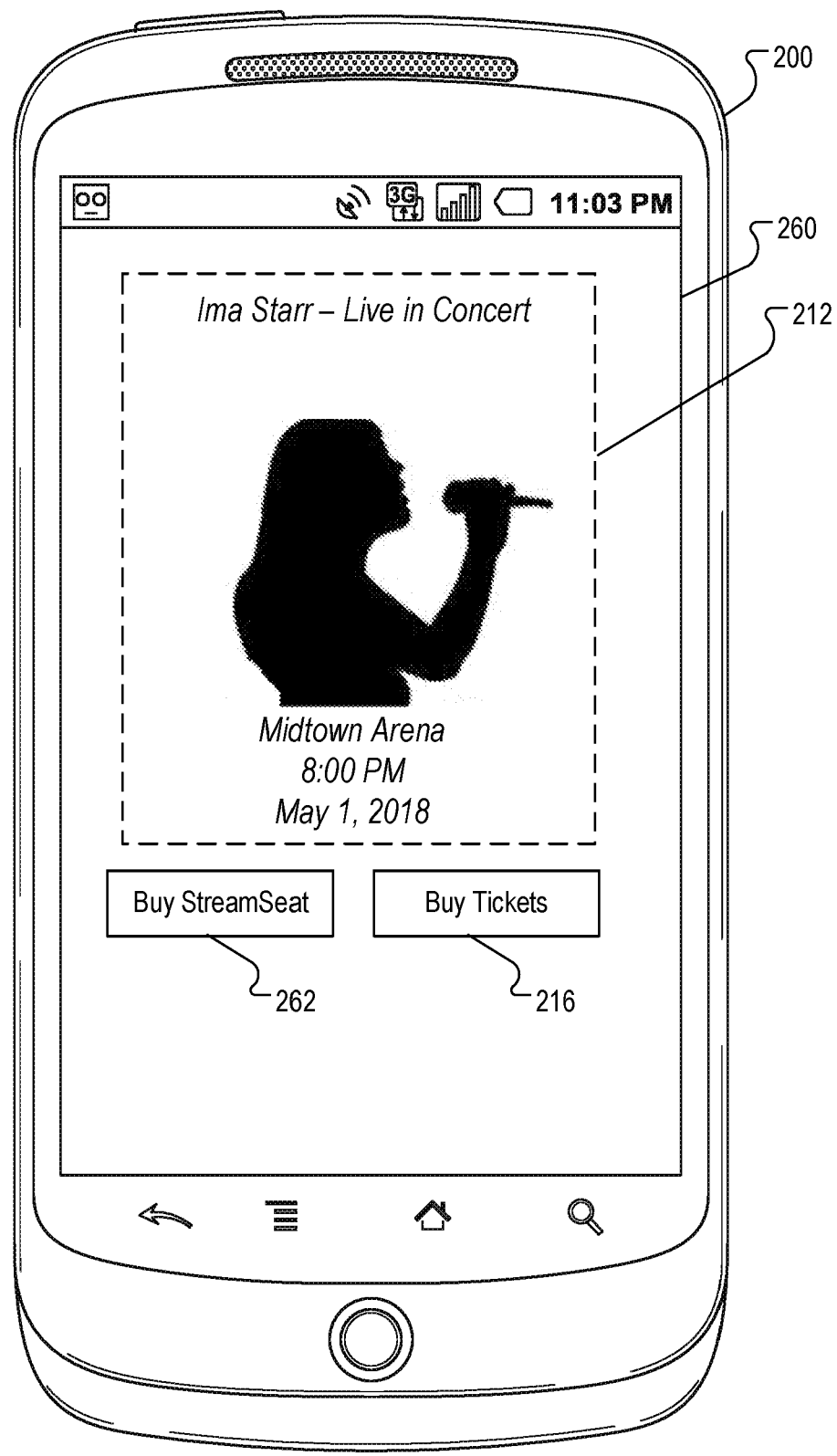

Assume the user wants to have a "Buy StreamSeat" action available. The user will select the "Select Application" option 252. The resulting user interface 260 of FIG. 2E is generated, wherein the interaction element 262 is displayed. Feedback data is also generated and provided to the model. The feedback data in this example would expose the model to the "Buy StreamSeat" action, and cause the model to consider the action for possible recommendations in the future.

Conversely, if the user selects the "Select OS Supported Action" option 254. The user will then be provided with a menu of other OS supported actions. An OS supported action is an action that is not specific to a particular application, and that may be available for multiple different applications and in multiple contexts. Examples of such actions are a share action, a save image action, and the like. Should the user select an OS supported action, then feedback data is also generated and provided to the model.

Figure 2F:
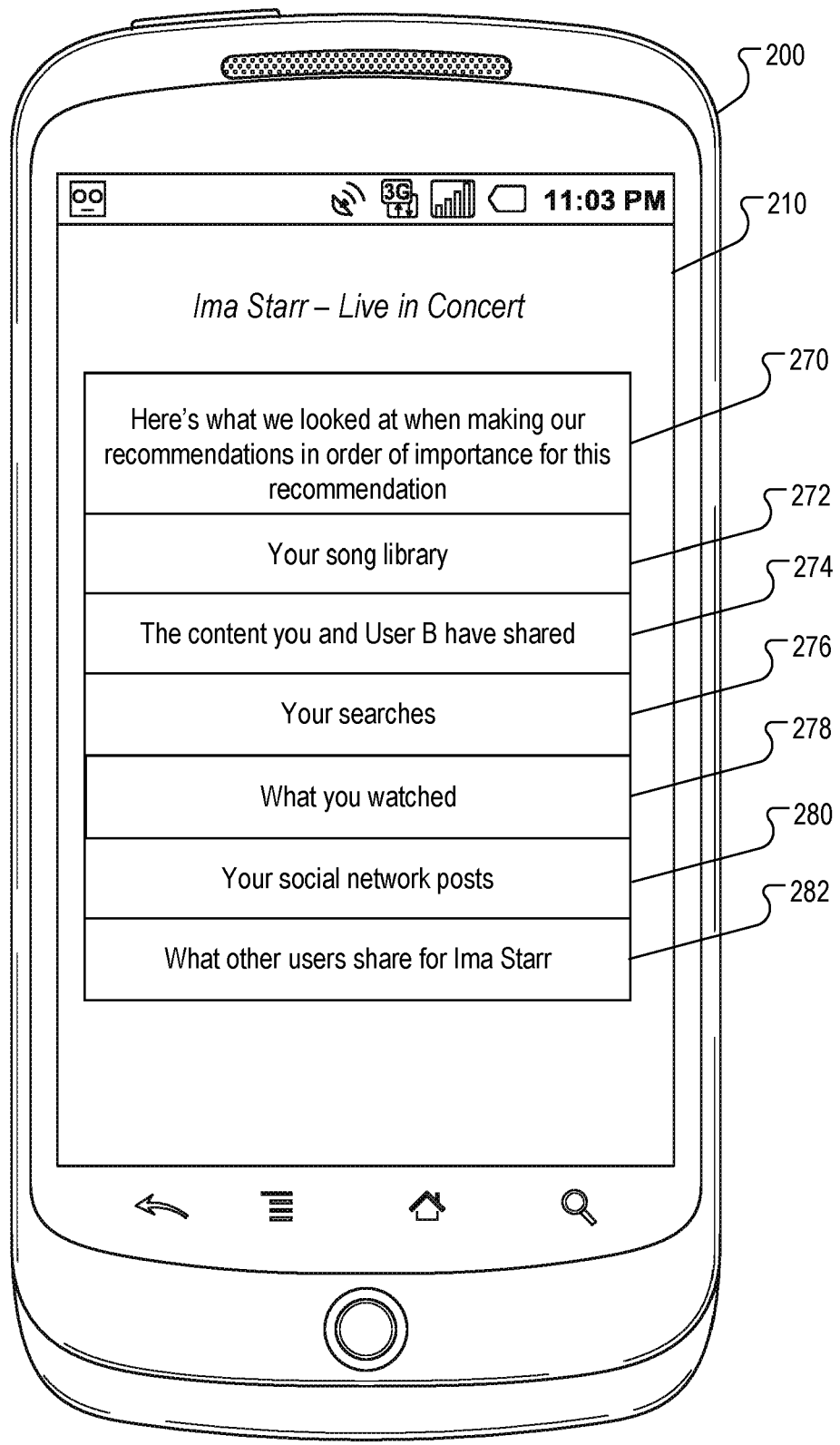

FIG. 2F illustrates a user interface 270 that is shown in response to a selection of the interaction element 232 of FIG. 2B. The user interface 270 lists user data according to data types, e.g., a song library 272 data type, a sharing with User B 274 data type, a searches 276 data type, a watched 278 data type, a social network posts 280 data type, and a what other users share for Ima Starr data type. The example data types 272, 274, 276, 278 and 280 are user specific to the user, while the example data type 282 is not specific to the user. Additionally, the example data types 272, 274, 276, 278, 280 and 282 are illustrative, and more data types or fewer data types may be used. In some implementations, the user interface lists every data type that the model 122 uses when evaluating recommendations.

In some implementations, the user interface may allow for the user to individually select data types for exclusion from model 122 processing. For example, the user may not wish the model to access social network posts, and thus may select, by use of user interface control the social network posts 280 data type and specify that the model 122 not use this data type.

In the example user interface of 2F, the user data that has been processed by the recommendation model 122 includes data specific to the user and other data that is not specific to the user. Often a recommendation model 122 is initially trained and provided to multiple users, e.g., as part of an operating system update. Accordingly, the model is not personalized for each user. Thus, the feedback data provided in response to user selections of feedback elements is used by each model instance to adjust future recommendations specific to the user. In some implementations, however, a model training system may receive feedback data from multiple user devices to evaluate the accuracy of the initially trained model 122. Should the user data indicate unacceptably high levels of user dissatisfaction, then the model 122 may be retrained.

Figure 4:
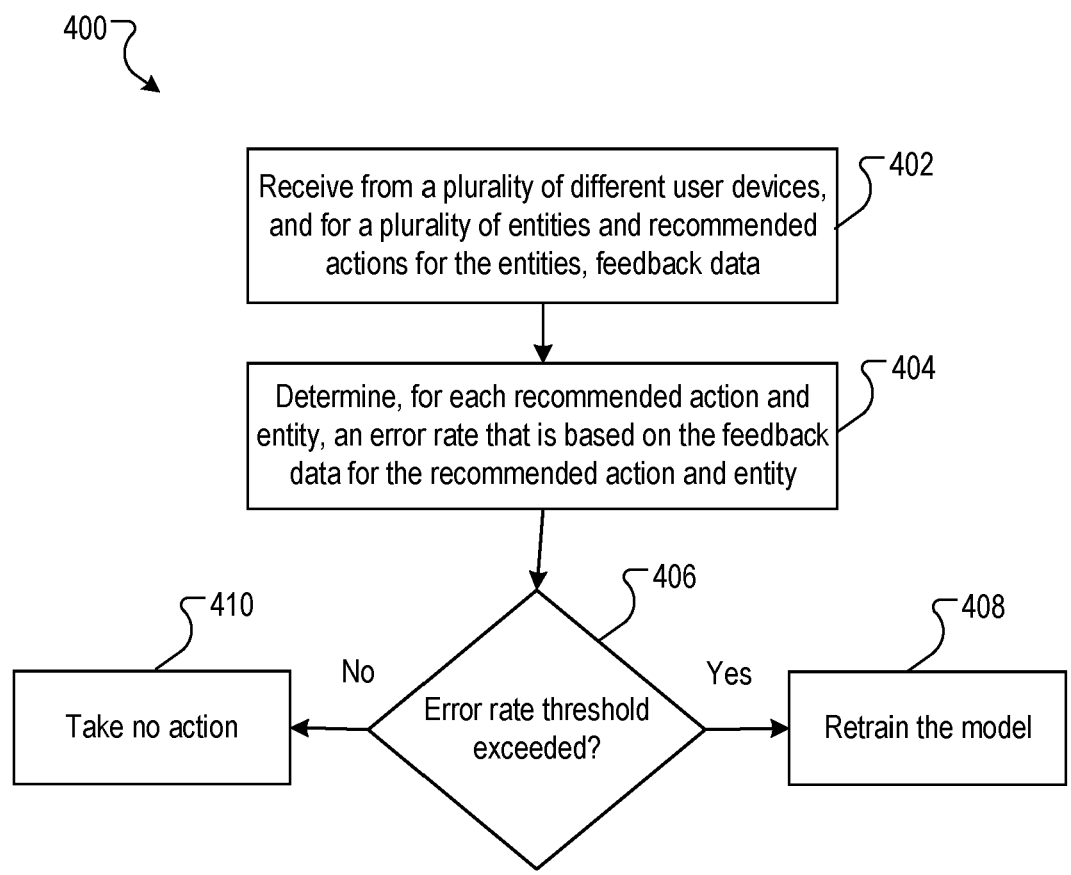
FIG. 4 is a flow diagram of a model retraining process.

FIG. 4 is a flow diagram of a model retraining process 400. The process 400 is typically implemented in a computer system that is separate from the user devices 106.

The process 400 receives, from a plurality of different user devices, and for a plurality of entities and recommended actions for the entities, feedback data (402). The feedback data will describe satisfaction of users with the model 122 recommendations. For example, high confirmation counts or promotion feedback for certain recommendations indicate the model is providing accurate recommendations. Additionally, a selection of an interaction element for a recommended action by the first interaction mode may also generate feedback data indicative of an accurate recommendation. However, feedback data that indicates the model 122 should not make certain recommendations or feedback data that indicates users have manually changed recommendations indicate dissatisfaction with the model 122 recommendations. Each indication of dissatisfaction is determined to be an error on the part of the model 122.

The process 400 determines, for each recommended action and entity, an error rate that is based on the feedback data for the recommended action and entity (404). The error rate, in some implementations, is based on an entity/recommended action pairing. However, the error rate could also be determined solely on the recommend action, and independent of the entity. The error rate may be a raw percentage based on a number of indications of inaccurate recommendations to a sum of the number of indications of inaccurate recommendations and a number of indications of accurate recommendations. Other appropriate statistical processes for determining an error rate can also be used.

The process 400 determines, based on the error rates, whether an error rate threshold is exceeded (406). The error rate threshold may be a value selected by model trainers. The determination of whether an error rate threshold is exceeded may be based on an average of the error rates for the model 122, or some other central tendency value based on the observed error rates.

If the error rate threshold is exceeded, then the process 400 retrains the model (408). The retrained model is then distributed to users. However, if the error rate threshold is not exceeded, then the process 400 takes no action with respect to retraining the model (410).

In the examples above, a model that recommends actions is used. However, the above processes can be used for any recommendation process. Such recommendations may include content recommendations, purchase recommendations, social network recommendations, and the like.

Example sets of decision data for display are described above. The decision data that are display may be one or more elements of the complete decision data set. A complete decision data set is all data considered by the system when making the decision. The one (or more) elements of decision data may be selected based on the weight of their contribution to the suggested action (e.g., most important feature). The weight may, for example, be obtained from the coefficients of the model used to make the recommendation.

Figure 5:
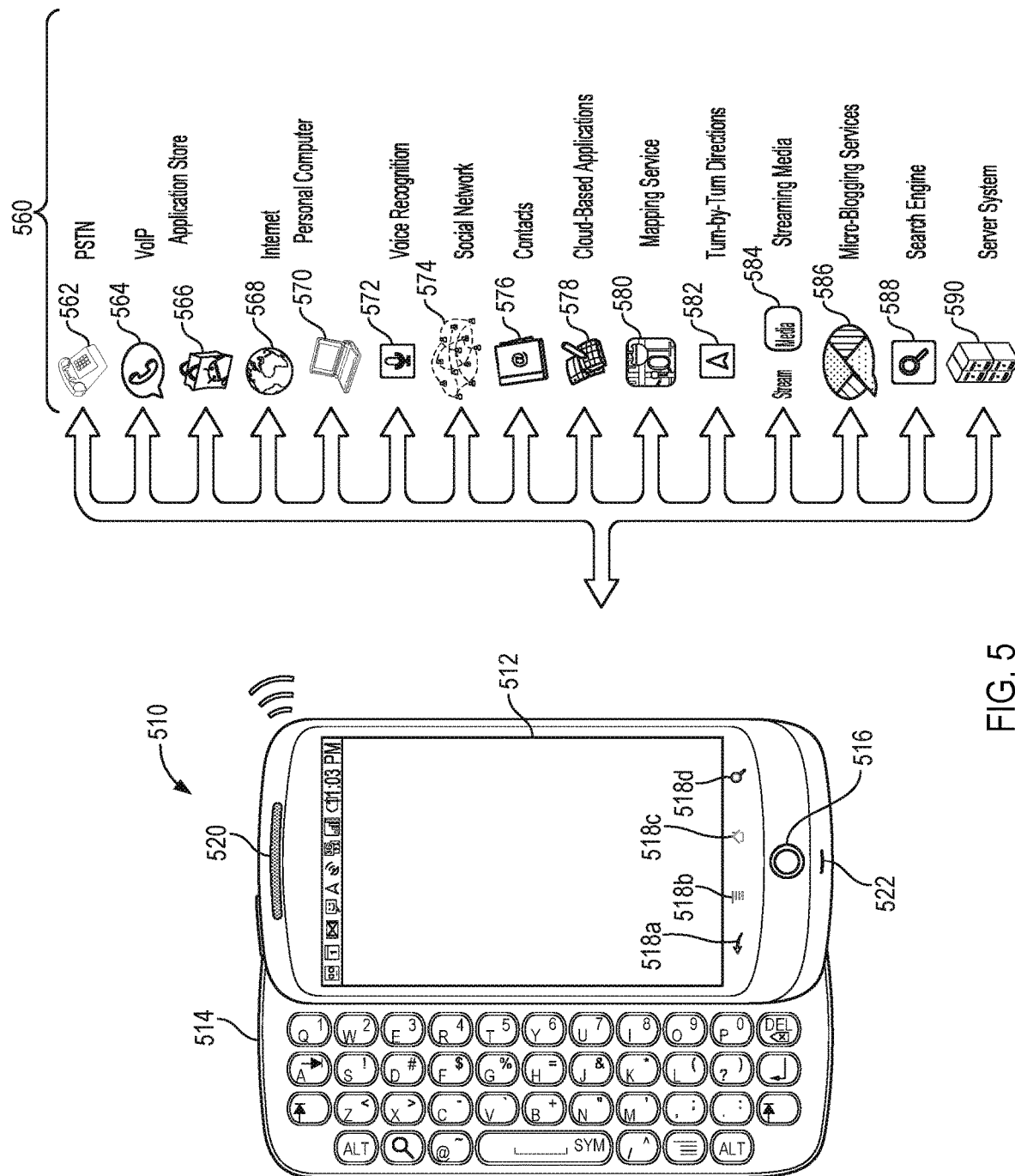
FIG. 5 is a block diagram of an example mobile computing device.

FIG. 5 is a block diagram of example mobile computing device. In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

The mobile computing device 510 may include other applications, computing sub-systems, and hardware. A voice recognition service 572 may receive voice communication data received by the mobile computing device's microphone 522, and translate the voice communication into corresponding textual data or perform voice recognition. The processed voice data can be input to the command models stored in the command models data 122 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program.

Mapping service 580 can provide the mobile computing device 510 with street maps, route planning information, and satellite images. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of what may be claimed, but rather as descriptions of features specific to particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by one or more processors, the method comprising:
    selecting, using an action selection model that processes decision data, a recommended action,
        wherein selecting the recommended action is from a plurality of actions that a user device may take and that are each different from each other action, and
        wherein the decision data comprises user data describing selections responsive to recommended actions by one or both of a particular user or interests of the particular user;
    providing, by the user device, an interaction element that describes the recommended action, wherein the user device is configured to perform the recommended action in response to a particular selection of the interaction element;
    receiving user input to select the interaction element;
    in response to receiving the user input to select the interaction element that describes the recommended action, providing, by the user device, (i) at least a portion of the decision data processed by the action selection model used to select the recommended action described by the interaction element and (ii) a selectable feedback element that, when selected, generates feedback data describing user satisfaction with the recommended action; and
    in response to receiving an indication that the feedback element has been selected by a user, causing the feedback data to be included in the user data, wherein subsequent selections using the action selection model are adjusted based on the feedback data included in the user data.

2. The method of claim 1, wherein the selectable feedback element is an action edit element that, when selected, generates feedback data indicating a user-selected action different from the recommended action selected by the action selection model be selected by the action selection model for subsequent selections of recommended actions for the particular user.

3. The method of claim 1, wherein the selectable feedback element is a demotion element that, when selected, generates feedback data indicating the recommended action be demoted by the action selection model for subsequent selections of recommended actions for the particular user.

4. The method of claim 1, wherein the selectable feedback element is a promotion element that, when selected, generates feedback data indicating the recommended action be prompted by the action selection model for subsequent selections of recommended actions for the particular user.

5. The method of claim 1, further comprising:
    receiving, from a plurality of different user devices, and for a plurality of entities and recommended actions for the entities, feedback data;
    determining, for each recommended action, an error rate that is based on the feedback data for the recommended action, and wherein the error rate measures a rate at which the user feedback data is determined to indicate user dissatisfaction with the recommended action;
    determining, based on the error rates, whether an error rate threshold is exceeded; and
    retraining an action selection model when the error rate threshold is exceeded.

6. The method of claim 1, wherein the one or more processors are of a computer system that is separate from the user device.

7. The method of claim 1, wherein the one or more processors are of the user device.

8. The method of claim 1, wherein the plurality of actions include one or more of a text messaging action, an e-mail action, a voice call action, a sharing action, a posting action, and a purchasing action.

9. The method of claim 1, wherein providing the decision data comprises:
    for features that describe data sets of the decision data, accessing data specifying corresponding weights for the features as determined by the action selection model;
    selecting a subset of the features based on the corresponding weights for the features, wherein a selected feature is determined to be a dominant feature based on its corresponding weight; and
    providing, for each feature that is determined to be dominant, a description of a feature.

10. A computer program product comprising one or more non-transitory computer-readable storage media having program instructions collectively stored on the one or more computer-readable storage media, the program instructions executable to:
    select, using an action selection model that processes decision data, a recommended action,
        wherein selecting the recommended action is from a plurality of actions that a user device may take and that are each different from each other action, and
        wherein the decision data comprises user data describing selections responsive to recommended actions by one or both of a particular user or interests of the particular user;
    provide, by the user device, an interaction element that describes the recommended action, wherein the user device is configured to perform the recommended action in response to a particular selection of the interaction element;

receive user input to select the interaction element;

in response to receiving the user input to select the interaction element that describes the recommended action, provide, by the user device, (i) at least a portion of the decision data processed by the action selection model used to select the recommended action described by the interaction element and (ii) a selectable feedback element that, when selected, generates feedback data describing user satisfaction with the recommended action; and in response to receiving an indication that the feedback element has been selected by a user, cause the feedback data to be included in the user data, wherein subsequent selections using the action selection model are adjusted based on the feedback data included in the user data.

11. The computer program product of claim 10, wherein the selectable feedback element is an action edit element that, when selected, generates feedback data indicating a user-selected action different from the recommended action selected by the action selection model be selected by the action selection model for subsequent selections of recommended actions for the particular user.

12. The computer program product of claim 10, wherein the selectable feedback element is a demotion element that, when selected, generates feedback data indicating the recommended action be demoted by the action selection model for subsequent selections of recommended actions for the particular user.

13. The computer program product of claim 10, wherein the selectable feedback element is a promotion element that, when selected, generates feedback data indicating the recommended action be prompted by the action selection model for subsequent selections of recommended actions for the particular user.

14. The computer program product of claim 10, the program instructions further being executable to:

receive, from a plurality of different user devices, and for a plurality of entities and recommended actions for the entities, feedback data;

determine, for each recommended action, an error rate that is based on the feedback data for the recommended action, and wherein the error rate measures a rate at which the user feedback data is determined to indicate user dissatisfaction with the recommended action;

determine, based on the error rates, whether an error rate threshold is exceeded; and retrain an action selection model when the error rate threshold is exceeded.

15. The computer program product of claim 10, wherein providing the decision data comprises:

for features that describe data sets of the decision data, accessing data specifying corresponding weights for the features as determined by the action selection model;

selecting a subset of the features based on the corresponding weights for the features, wherein a selected feature is determined to be a dominant feature based on its corresponding weight; and providing, for each feature that is determined to be dominant, a description of a feature.

16. A system comprising:

a processor, a computer-readable memory, one or more computer-readable storage media, and program instructions collectively stored on the one or more computer-readable storage media, the program instructions executable to:

select, using an action selection model that processes decision data, a recommended action, wherein selecting the recommended action is from a plurality of actions that a user device may take and that are each different from each other action, and wherein the decision data comprises user data describing selections responsive to recommended actions by one or both of a particular user or interests of the particular user;

provide, by the user device, an interaction element that describes the recommended action, wherein the user device is configured to perform the recommended action in response to a particular selection of the interaction element;

receive user input to select the interaction element;

in response to receiving the user input to select the interaction element that describes the recommended action, provide, by the user device, (i) at least a portion of the decision data processed by the action selection model used to select the recommended action described by the interaction element and (ii) a selectable feedback element that, when selected, generates feedback data describing user satisfaction with the recommended action; and in response to receiving an indication that the feedback element has been selected by a user, cause the feedback data to be included in the user data, wherein subsequent selections using the action selection model are adjusted based on the feedback data included in the user data.

17. The system of claim 16, wherein the selectable feedback element is an action edit element that, when selected, generates feedback data indicating a user-selected action different from the recommended action selected by the action selection model be selected by the action selection model for subsequent selections of recommended actions for the particular user.

18. The system of claim 16, wherein the selectable feedback element is a demotion element that, when selected, generates feedback data indicating the recommended action be demoted by the action selection model for subsequent selections of recommended actions for the particular user.

19. The system of claim 16, wherein the selectable feedback element is a promotion element that, when selected, generates feedback data indicating the recommended action be prompted by the action selection model for subsequent selections of recommended actions for the particular user.

20. The system of claim 16, the program instructions further being executable to:

receive, from a plurality of different user devices, and for a plurality of entities and recommended actions for the entities, feedback data;

determine, for each recommended action, an error rate that is based on the feedback data for the recommended action, and wherein the error rate measures a rate at which the user feedback data is determined to indicate user dissatisfaction with the recommended action;

determine, based on the error rates, whether an error rate threshold is exceeded; and retrain an action selection model when the error rate threshold is exceeded.

* * * * *